Jan. 30, 1968 T. A. COHEN 3,366,946

MULTIPLE TAPE TRANSMITTERS FOR CHANGING MESSAGE SIGNS AND THE LIKE

Filed March 19, 1965 2 Sheets-Sheet 1

Inventor:

Theodore A. Cohen

By Solomon J. Lehrer

Attorney.

Inventor:

Theodore A. Cohen

By Solomon J. Lehrer

Attorney.

United States Patent Office 3,366,946
Patented Jan. 30, 1968

3,366,946
MULTIPLE TAPE TRANSMITTERS FOR CHANGING MESSAGE SIGNS AND THE LIKE

Theodore A. Cohen, Chicago, Ill., assignor to Naxon Telesign Corporation, Chicago, Ill.

Filed Mar. 19, 1965, Ser. No. 441,237
6 Claims. (Cl. 340—339)

ABSTRACT OF THE DISCLOSURE

The invention is a tape-controlled changing message sign wherein a plurality of tape readers are employed to alternately transmit information into the sign display. Each tape reader is provided with a single transverse row of tape-sensing elements which, as a tape is fed therethrough, reads the taped message characters as well as a shift-command tape signal. The latter comprises a single transverse tape bit adapted to interrupt the tape feeding of its own reader as said signal bit is sensed and to simultaneously command a second tape reader to read the message characters passing therethrough until the latter tape reader senses are identical shift-command signal from its tape, whereupon tape-feeding through the second reader is interrupted as the first reader, concurrently with said interruption, resumes reading and feeding of its tape.

This invention relates to the transmission of impulses from character-containing tapes, to thereby control the display of characters in an electrically-illuminated sign. This invention may be considered an improvement of Patent No. 3,123,815, dated Mar. 3, 1964. As with the patent, this invention deals more specifically with moving-message displays originating on message bearing tapes.

The broader objects of this invention are similar to those described in Patent No. 3,123,815 in the respect that a plurality of message tapes are likewise employed in the present invention.

One object of the present invention is to provide a novel switching technique between a plurality of transmitters whereby to switch automatically from one transmitter to the other, and vice versa, in any predetermined sequence, by tape command. A further object is to provide an improved keyboard-controlled means for effecting the automatic switching mentioned.

Another object is to provide means for making a line transfer system responsive to a pre-arranged tape signal without the requirement for auxiliary tape reading means, while still another object is to provide an improved transfer system and particularly one which is unresponsive to torn or absent tapes.

Further objects of my invention are to provide means for preventing deactivation of signal lines during transition periods, particularly when line contacts transfer from one position to another in the absence of which deactivation errors may appear on the sign panel; to provide a unique gating system for commanding circuit transfer responsive to prechosen element bits upon the tape, but unresponsive to such element bits if they are a portion of an alphabetical or numerical character; to provide a transfer system having bi-stable characteristics irrespective of waveform shape of the shift-command signal.

Still further objects of my invention are to provide means for preventing disturbance to the transfer impulse system during the time of line contact transition and to provde means for manual control of the transfer system where local or nonautomatic control is desired, while additional objects will become apparent as the specification progresses.

Figure 1A:
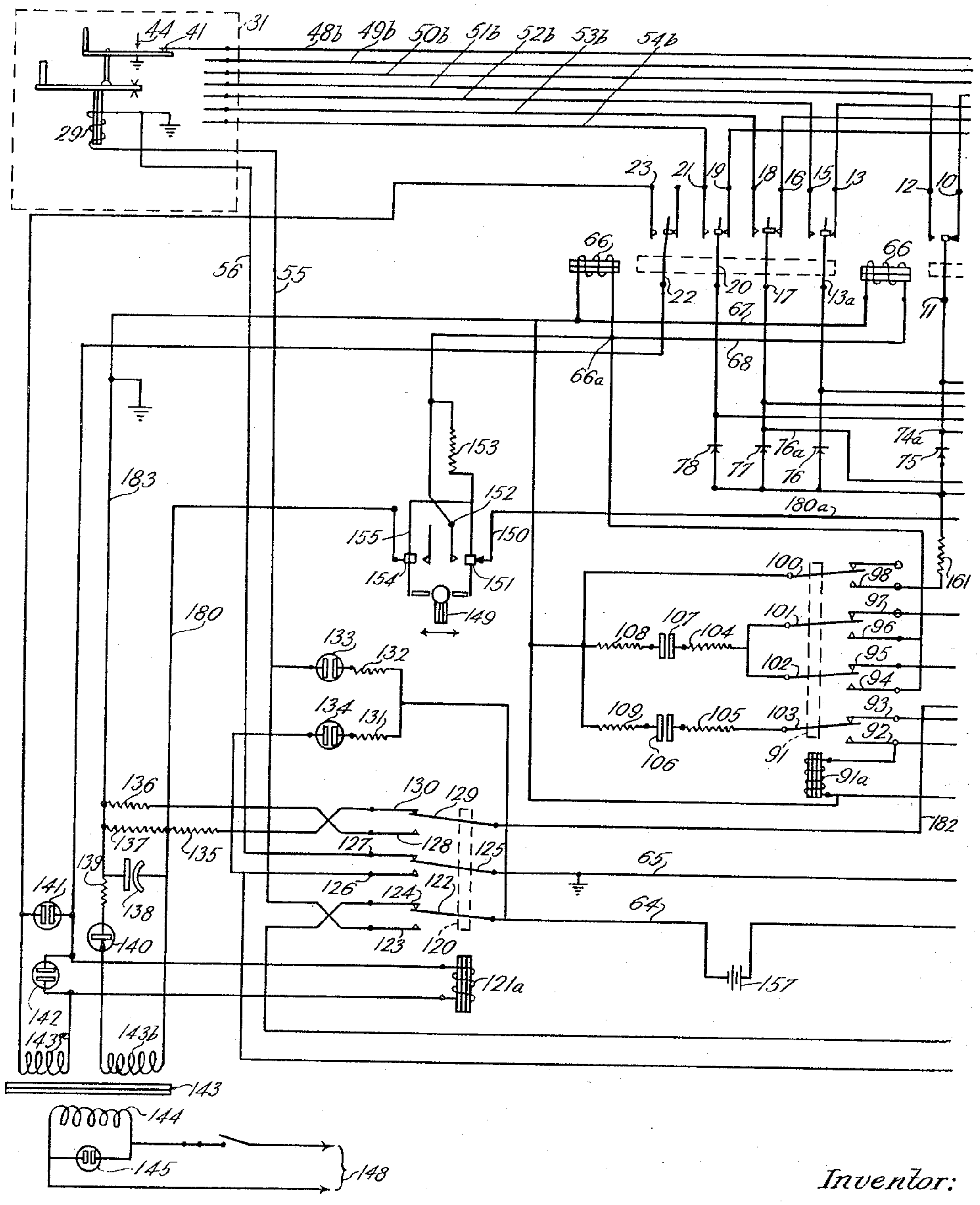
Figures 1B, 2:
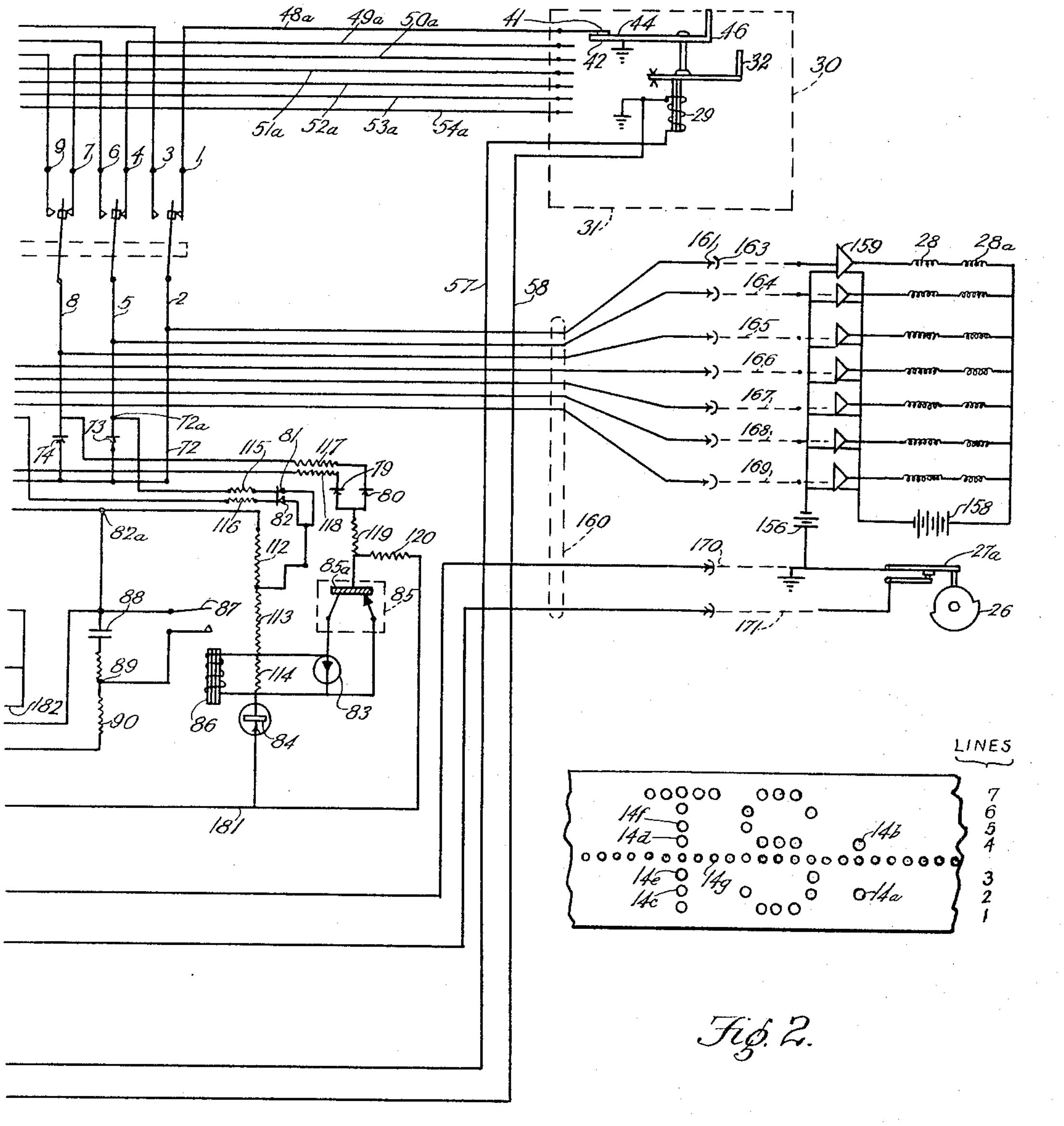

In accordance with the foregoing, a better understanding of the improvement may be gained by referring to the accompanying drawing in which: FIG. 2 represents a fragmentary length of a message tape upon which appear alphabet characters followed by a shift-command signal. FIGS. 1*a* and 1*b* are a schematic electrical circuit showing the functional system in its preferred form.

In FIG. 2 the message tape portion bearing perforated alphabet characters are represented in the form of letters T and S; likewise a series of small perforations 14*g* representing tape sprocket feed-holes, for transporting tapes through transmitters. However, unlike the transmitter switching symbols 14 and 15 illustrated in FIGS. 1 and 2 of Patent No. 1,123,815, the present transfer signal is represented by perforations 15*a* and 14*b* in longitudinal rows or lines 2-and-4, respectively; such signal rows (not feed-holes) being for present purposes named 1 to 7 progressing upwardly from the lower edge of the tape.

The particular character which will hereinafter be designated as the shift-command, has been specifically chosen as being unique in the English alphabetical punctuation sytsem, appearing as a modified semi-colon displaced in tape geometry from a standard semi-colon which could normally appear in the tape in rows 1 and 4. Also such symbol appearing upon the lamp panel acts as a visual tape-shift telltale. Since it is an object of this invention that the shift-command be functional in transferring the control system to be described without the use of auxiliary tape reading means such as shown in FIG. 3 of Patent No. 3,123,815, my invention therefore incorporates apparatus sensitive to open or close condition of those contacts in tape-readers 30 and 31; such apparatus being sensitive to the presence of holes 2-and-4 and unresponsive to either hole 2 or 4 individually. Therefore, if holes 2-and-4 are present in the tape bit and upon such a 2-and-4 symbol having been transported to the reading position in transmitter 30 or 31 the system will be commanded to transfer its condition, as will hereinafter be described.

It is obvious also that the symbol 2-and-4 may be an integral part of other alphabetical or numerical characters in the tape, such as in the letter T, at 14*c* and 14*d*. It will be immediately apparent that should such shift symbol 2-and-4 be a portion of any other tape character, an undesirable shift-command will be perpetrated and an undesired transfer of the system will take place. This is prevented as follows:

A study of the English alphabetical system, its accompanying Arabic numeral system, as well as commonly used punctuation symbols, has indicated that where such characters contain a 2-and-4 shift-command, certain other perforations in the tape forming a portion of such standard characters can be used to prevent transfer, even if the 2-and-4 shift-command is present. Such a unique combination among other possible combinations has been found to be the bit perforations 3 or 6, illustrated as 14*e* or 14*f*. It should be noted that unique means have been made a portion of the system, which prevents transfer if a voltage is present at those contacts in the tape readers which supervise either a 3 or a 6 perforation in the tape.

Thus, if a 2-and-4 symbol is present alone upon the tape, the system will be commanded to transfer its conditon, while if the same signal is present as a portion of a character in which either a 3 or a 6 or a 3-and-6 are present the system will be prevented from transferring its condition. This particular logic has been chosen as desirable command bits significant to Teutonic language and Arabic numeral characters. Other logic arrays can be chosen where required, to be significant in other languages as for instance Cyrillic, Greek, or Arabic. In order to perform the foregoing logic, a combination gating system, consisting of a dual element "and" gate and a dual element "or" gate is incorporated, for driving a relay 86, which transfers the system upon contacts 87 thereof being momentarily closed.

The energization of relay 86 can only take place if a 2-and-4 symbol is read upon a tape by an activated transmitter. This is accomplished through the combination of diodes 81 and 82 which form the acceptance (and) gate. A resistor network 112, 113, 114, together with relay 86 is energized from a D.C. energy source, consisting of transformer secondary 143*b*, rectifier 140 and resistor-capacitor filter combination 137–138–139 via conductors 180*a* and 181; the resistor values are chosen to provide sufficient current through relay 86 to insure such relay being pulled up to close contacts 87.

The diode network 81, 82 is fed through resistors 115, 116 from data lines representing tape rows 2 and 4, respectively, as at 72*a* and 74*a*. The common return of these diodes is connected to the junction of resistors 112, 113.

Where perforations are not present in a tape being read, the reader contacts which superintend tape rows 2 and 4 are closed and such reader lines are therefore grounded via 41, 44 of transmitter 30. Therefore, diodes 81, 82 are forward biased and the junction of resistors 112, 113 is placed at ground, in which case current through relay 86 falls to zero and contacts 87 are open.

If either a 2 or a 4 contact remains at ground, the relay 86 will remain deenergized, since the corresponding diode remains forward biased and therefore either a 2 or a 4 perforation apeparing alone upon the tape will leave the relay 86 unactuated. Should a 2-and-4 perforation shift-commond signal appear on the tape and be read, both diodes 81 and 82 will be reverse biased; due to negative signal voltages from source 156 appearing on the reader lines 2 and 4, ground being simultaneously lifted from these lines, by 2 and 4 contacts opening. Therefore, normal voltages will be reestablished upon resistor networks 112, 113, 114, current will rise through relay 86; contact 87 will close and the system state will be transferred as will presently be seen. It will be understood that a 2 or 4 individual perforation leaves relay 86 unactuated, while a combined 2-and-4 perforation will cause relay 86 to be activated.

It has been mentioned that the 2-and-4 shift-command can be present as a portion of another character and if such a code symbol is present, an undesirable operation of relay 86 could take place. However, a negation circuit is provided through the incorporation of an "or" gate, functional from lines 3 or 6, wherein the diodes 79 and 80 are circuited respectively through resistors 117 and 118 to reader lines 73*a* and 76*a*, these lines supervising tape perforation rows 3 or 6 respectively. The function of the negate circuit is to prevent relay 86 from being energized by a 2-and-4 shift-command, if a 3 or 6 perforation is present in the tape character.

Such action is accomplished through the introduction of the transistor 85, which has its emitter, collector circuit shunted across relay 86. The diode 84 is forward biased by current flow through networks 112, 113, 114, to beyond diode plateau whereupon a regulated fixed bias off-current is provided through resistor 120 to transistor base 85*a*. The transistor 85 is therefore nonconducting and does not affect distribution of voltages in networks 112, 113, 114, and relay 86.

The diodes 79 and 80 are normally reverse biased, when reader lines 3 or 6, or both, are grounded and transistor 85 remains biased off. Should a 3 or a 6 perforation appear on tape, ground is lifted from the corresponding reader line and corresponding diode 79 or 80 is forward biased by negative potential appearing on line from source 156. Such potential will now be applied to base 85*a* of transistor 85 through resistor 117 and diode 80 or resistor 118 and diode 79, forcing transistor 85 into conduction. The conducting transistor shunts relay 86 and prevents function thereof. Thus if a 2-and-4 shift-command is present, relay 86 will close, while if an accompanying 3 or 6 signal is simultaneously present in a tape character, relay 86 will be shunted by conductive transistor 85 and and relay 86 will remain deactivated. A protective diode 83 is reverse-shunted across relay 86 to prevent destructive surges due to relay inductance from damaging transistor 85 when such relay is deactivated.

For stable transfer operation of the system, it is important that such transfer be accomplished without chatter or oscillation when the tape shift-command is read. The relay transfer system must in all cases exhibit true, bi-stable characteristics; that is, only a single pulse command from the shift-command reading system should result in a stable transfer, irrespective of the duration, or the shape of the shift-command pulse, and only responsive to the leading edge of such pulses. Accordingly, the system is conceived to only transfer its state upon the appearance of such leading edge, irrespective of the interval between the leading edge of a pulse and the leading edge of a following pulse. To accomplish this objective reference is made to a source of D.C. energy, provided by transformer secondary 143*b* of transformer 143, rectifier 140 and filter networks 139–138–137; the transformer 143 being powered from the A.C. line supply 148.

The multipole relay 66 has resistor 153 in series with terminal 66*a*, and is then routed through switch 149 via contacts 155, 154, and conductor 180 to one side of the energy supply. The other terminal of coil 66 is routed to other side of the energy supply. The operating differential of relay 66 and the value of resistor 153 are chosen so that for usual values of line voltage variation, resistance value of resistor 153 is high enough to prevent relay 66 from pulling up and low enough to prevent same releasing, once pulled up.

When contacts 87 are open, the relay 91 is deenergized as shown. Under such condition, capacitor 107 is charged from D.C. line through resistors 108 and 104 and parallel contacts 101, 102, back contacts 97, 95, conductor 182, contacts 129, 130 of relay 120 and resistor 135. The capacitor 106 at the same time is charged from line through resistors 109, 106, contacts 103, 93, conductor 82 and contacts 150–151–155–154 of manual transfer switch 149, to conductor 180. The resistors 109–105–104–108 are chosen to reduce peak currents through contacts 101, 102, and 103 during charge or discharge of capacitors 107 and 106, thus prolonging contact life.

Upon contact 87 closing due to the relay 86 being momentarily energized by the gating system, relay 91 is pulled up, being energized from line supply via conductor 82*a*, contacts 150–151–155–154 of switch 149, conductor 180, which other side of relay 91 receives return energy via conductor 183. The closing of relay 91 transfers contacts 101, 102, from capacitor-charging contacts 95, 97 to forward contacts 96, 94 whereupon capacitor 107 discharges its stored energy into relay coil 66 via conductors 183 and 184. This pulse of energy pulls up relay 66, which locks in as described above, due to resistor 153. Simultaneously the closing of contact 103, 92 of relay 91, allows charged capacitor 106 to discharge its energy into relay coil 91*a*, thus maintaining the latter energized for a length of time determined by the capacitance of 106, the resistance of 105, and resistance of relay coil 91*a*. The fixing of holding time of relay 91 in this manner, allows relay contact 87 to pulse in any indeterminate manner, without causing erratic operation of the transfer system.

The relay 120 is shown in its deenergized position wherein the step electromagnet 29 of transmitter 30 is pulsed from energy source 157, via cam-driven circuit breaker 27*a* and contacts 122–124. Auxiliary contacts 22–23 of relay 66, pilots power for relay coil 121*a* from secondary 143*a* of transformer 143. Neon indicator lamps, 142–141, are provided to indicate the on or off condition of relay 120 and thereby indicate which of the transmitters 30 or 31 has been selected.

Thus, if relay 66 is energized the lines 163 to 169 are transferred from reader lines 48a to 54a respectively, of tape reader 30, to reader lines 48b to 54b respectively of tape reader 31, by the transfer of contacts 2–5–8–11–13a–17–20 from fixed contacts 1–4–7–10–13–16–19 respectively to fixed contacts 3–6–9–12–15–18–21. Also the transfer of contact 22 to 23 relay 66 energizes relay 120 which then transfers pulse power from energy source 157 and cam contact 27a, from electromagnet 29 of tape reader 30, to electromagnet 29 of tape reader 31. It is desirable that some delay be provided between the transfer of relay 66 from back contacts to forward contacts, before alternate transmitters are energized, such delay being provided by piloting relay 120 from auxiliary contact poles 22, 23 so that relay 66 operates first and relay 120 a predetermined interval later. The reverse cycle of delay takes place when relay 66 resets to its former deenergized condition, thereby opening contact 22–23 and deenergizing relay 120 to reselect the alternate transmitter.

The two 4-pole double-throw relays 66 have their coils connected in parallel, so that the combination acts as an 8-pole double-throw unit. This assembly is used in order to attain reasonable compactness and efficiency, although an 8-pole relay may be employed. When these relays are in the deenergized condition, the movable contacts 2–5–8–11–13a–17–22 are each respectively in contact with fixed contacts 1–4–7–10–13–16–19, with the resulting connection of lines 48a through 54a from reader contacts of transmitter 30, to the respective lines 163–164–165–166–167–168–169 via cable 160 and then to amplifiers 159, amplifier bias supply 156, and ball-release systems 28 and 28a, which correspond to ball-release 12–12a, FIG. 3, of Patent 3,123,815.

Upon relay 66 receiving a lock up pulse from contact 87, line contacts 2–5–8–11–13a–17–22 are transferred from fixed contacts 1–4–7–10–13–16–19 to fixed contacts 3–6–9–12–15–18–21 thereby transferring transmission lines 160 from reader contacts of transmitter 30 to reader contacts of transmitter 31. The transfer action of relay 66 and its locking takes place at the first closure of relay contact 87; the relay 66 remaining locked up, even though relay 86 is thereafter deenergized by the opening of reader lines superintending tape reader contacts 2 and 4 during the transfer of relay 66 to its new locked position. Thus the relay 66 has transferred reader lines from transmitter 30 to 31, while contacts 22, 23 of relay 66 have pulled up relay 120 and thus transferred contacts 122 and 125 from back contacts 124 and 127 to forward contacts 123 and 126.

The cam switch 27a driven by machine cam 26 and energy source 157 are via conductors 64, 65 connected to movable contacts 122, 125 of relay 120, and thereby tape transport electro-magnet 29 of transmitter 30 when relay 120 is deenergized, and tape transport electromagnet 29 of transmitter 31, when relay 120 is energized. The combination of relay 66 and 120 has therefore been locked up, by the momentary closing of contact 87 in response to the shifting command signal 2-and-4 in the tape in transmitter 30, whereupon transmitter 30 has been disconnected from transmission lines 160 and pulse step lines 65, 64 and replaced with transmitter 31. When transmitter 31 is now activated, it is required that the system be retransferred to its former state by a new shift-command 2-and-4 signal in the tape in active transmitter 31. This is accomplished again through the momentary closing of relay contact 87, in response to a gate signal activation of relay 66 as follows:

It will be noted from prior description that the relay 66 had been pulled up by a pulse from charged capacitor 107. In the meantime, the transfer and locking up of relay 66 had deactivated signal to gating relay 86, by opening reader lines 2-and-4 whereupon relay 91 is deenergized, leaving relay 120 locked in. Capacitor 107 is now completely discharged via contacts 101, 102, to contacts 97, 95, conductor 182, contact 129 to contact 128 of locked up relay 120, resistor 136 and conductor 183.

Upon a new shift-command arriving from a shift signal 2-and-4 from tape in transmitter 31, relay contact 87 again closes. The closing of relay contacts 87, activates relay 91 whereupon discharged capacitor 107 is connected via contacts 101, 102 to contacts 94, 96 across coil of relay 66. The shunting of such relay coil by a discharged capacitor of proper value, momentarily drops voltage across such coil to below its hold-in value and relay 66 therefore is released. The releasing of relay 66 resets relay 120 by the opening of contacts 22, 23, retransfers all lines back to transmitter 30 and restores the system to original condition.

It will be recalled that mention was made that during transfer of relay 66 from one contact position to the other, the lines from a transmitter to amplifiers 159 are momentarily open. The opening of line circuits (48a, 49a, 50a, etc.) during the time of transition of relay 66 from back contacts to front contacts would tend to produce readable errors upon the sign panel, since opening of line circuits deenergizes amplifiers 159, which in turn deenergizes ball-releases 28–28a, and lamp-flashing balls will be dropped. It is therefore apparent that transfer from one transmitter to the other should be done without allowing ball releases 28–28a to be deenergized, while still allowing the coded transfer signal to be routed to the appropriate gating system, which in turn will eventually actuate relay 86. This object is accomplished by making use of auxiliary diodes 72–73–74–75–76–77–78, respectively, each having its cathode connected to line terminals 2–5–8–11–13a–17–20 respectively.

All diode anodes are brought to a common lead and connected to contact 98 of relay 91 via resistor 161. Thus, upon energizing relay 91, contact 98–100 is made and all lines are effectively commoned to line 183, during the moment of transfer of poles 2–5–8–11–13a–17–20–22 from contacts 1–4–7–10–13–16–19 to contacts 3–6–9–12–15–18–21. The lines are therefore momentarily grounded, maintaining ball-releases 28–28a energized during transition of relay 66. As soon as such transfer has been completed, contact 98–100 reopens, as relay 91 is deenergized by the resetting of relay 86 and opening of contact 87. This is made possible since the operating time and release time of relay 91 has been apportioned to just cover the transition time of pole transfer relay 66.

The auxiliary manual transfer is employed where it is desired to actuate either transmitter by manual selection. This is embodied in selector switch 149, which in position shown allows system to function in an automatic manner as has been previously described.

When switch 149 is thrown to the left, to manually select transmitter 31, contact 150, 151 is opened, while contact 151, 152 is closed. Opening 150, 151 deenergizes impulse transfer system by opening lead 180a and thereby disconnecting energy sources 137–138–139–140. Closing 151, 152 short circuits resistor 153, whereupon relay 66 obtains full power and locks in, transferring all control lines to transmitter 31.

Where switch 149 is thrown to the right, to manually select transmitter 30 contacts 154, 155 are opened, opening power lead 180 from energy sources 137–138–139–140 and leaving relay 66 and 120 in deenergized position.

While I have depicted the use of this invention for such applications as interspersing commercial messages among news items by employing a separate transmitter for each class of items, other uses of my invention will become apparent. For example, the same or a similar tape symbol may be employed in conjunction with the gating system described to perform functions other than switching in a second transmitter or to perform other functions which are additional to that of switching in another transmitter. It is obvious that such additions or changes may be made in the details set forth without departing from the spirit and scope of the invention as defined in the claims.

I claim:

1. A tape-controlled sign comprising a display made up of a plurality of rows of selectively illuminable elements, a pair of tape readers having message-bearing tapes, reader-selection means operatively connected to the tape readers for circuiting but one reader at a time into controllable relation with said illuminable elements, each reader having a read head comprising a row of tape-sensing elements extending laterally of the tape and adapted to read the messages carried thereby, means on said tapes for operating, without interfering with the message information carried thereon, said reader selection means and controlling a portion of the rows of tape-sensing elements and means connected to said tape sensing means and responsive to the reader-selection operating means for energizing the reader-selection means.

2. A changing message-display utilizing a message tape containing alpha-numeric and switching symbols, a tape reader therefor with a read head comprising a lateral row of tape-sensing elements for reading the messages thereon, means for moving the tape longitudinally past said elements to cause the message information thereon to appear on said display, electrical circuit means responsive to the tape-sensing elements that read said tape and adapted to superintend, without interfering with the message information transmitted to said display, a portion of said tape-sensing elements in said row to effect predetermined switching functions in said system in addition to the reading of the message information representing said alpha-numeric symbols and additional electrical circuit means connecting said read head to said display.

3. A changing message display utilizing a message tape containing alpha-numeric and switching symbols, a tape reader therefor having a single row of tape-sensing elements for reading the messages thereon, means for moving the tape longitudinally past said elements to cause the message thereon to appear on said display, electrical circuit means responsive to the tape-sensing elements that read said tape and adapted to superintend and respond to a command signal sensed over a portion of said tape-sensing elements to effect switching functions in said system in addition to reading said alpha-numeric symbols while, at the same time, responding to a negating signal received over another portion of said tape-sensing elements which latter signal, when received simultaneously with said command signal, automatically cancels said command signal and additional electrical circuit means connecting said tape-sensing elements to said display.

4. A changing message sign display utilizing a message tape containing alpha-numeric and switching symbols, a tape reader therefor having a row of tape-sensing elements for reading the messages thereon, circuit means connected between said tape reader and said display, means for moving the tape longitudinally past said elements to cause the message thereon to appear on said sign, additional electrical circuit means responsively connected to the tape-sensing elements that read said tape and adapted to control switching functions in said system other than the reading of said alpha-numeric characters, said additional electrical circuit means comprising a combination gating system having a dual element "and" gate combined with a dual element "or" gate and said dual elements connected to preselected tape-sensing elements in said row.

5. A tape-controlled sign comprising a display made up of a plurality of rows of selectively illuminable elements, a pair of tape readers having message-bearing tapes reader-selection means operatively connected to the tape readers for circuiting but one reader at a time into controllable relation with said illuminable elements, each reader having a read head comprising a single row of tape-sensing elements extending laterally of the tape and adapted to read the messages carried thereby, means on said tapes for operating said reader-selection means controlled by said tape-sensing elements and responsive only to signals other than said messages from said tape-sensing elements to select a given reader into controllable relation with said illuminable elements, means connected to said given reader and responsive to the reader-selection operating means for energizing the reader-selection means and additional electrical circuit means connecting said given reader to said display.

6. A display system of the character described comprising a pair of tape readers, circuit means connecting said readers to the display, means for automatically transferring but one reader at a time into tape-reading relation to the display through said circuit means, tapes for said readers comprising symbols representing alphabetical or numerical characters including reader-transfer symbols, a gating circuit comprising a diode network for commanding reader-transfer in response to prechosen tape-information symbols but unresponsive to tape-information symbols if the latter is any portion of an alphabetical or numerical character, said network provided with a dual element "and" gate and a dual element "or" gate, said gates being connected to the means for automatically transferring the readers to control the latter means.

References Cited

UNITED STATES PATENTS

| | | | |
|---|---|---|---|
| 2,788,886 | 4/1956 | Paulding et al. | 340—154 |
| 3,015,806 | 1/1962 | Wang et al. | 340—147 |
| 3,123,815 | 3/1964 | Naxon | 340—172.5 |
| 3,291,919 | 12/1966 | Robitaille | 340—147 |

FOREIGN PATENTS

| | | |
|---|---|---|
| 545,210 | 6/1956 | Italy. |

JOHN W. CALDWELL, *Primary Examiner.*

NEAL C. READ, *Examiner.*

A. J. KASPER, *Assistant Examiner.*